United States Patent [19]

Matthews

[11] 3,898,020
[45] Aug. 5, 1975

[54] GEOTHERMAL ENERGY SYSTEM AND METHOD
[75] Inventor: Hugh B. Matthews, Acton, Mass.
[73] Assignee: Sperry Rand Corporation, New York, N.Y.
[22] Filed: May 8, 1974
[21] Appl. No.: 468,130

Related U.S. Application Data
[62] Division of Ser. No. 300,058, Oct. 24, 1972, Pat. No. 3,824,793.

[52] U.S. Cl. .................................. 417/379; 60/641
[51] Int. Cl. ..... F04b 17/00; F01k 25/00; F03g 7/00
[58] Field of Search ............ 60/641, 645, 651, 670, 60/671; 417/379, 405, 406, 408

[56] References Cited
UNITED STATES PATENTS
3,751,673  8/1973  Sprankle...................... 60/641 X

*Primary Examiner*—Martin P. Schwadron
*Assistant Examiner*—Allen M. Ostrager
*Attorney, Agent, or Firm*—Howard P. Terry

[57] ABSTRACT

A geothermal energy transfer and utilization system makes use of thermal energy stored in hot solute-bearing well water to generate super-heated steam from an injected flow of clean water; the super-heated steam is then used for operating a turbine-driven pump at the well bottom for pumping the hot solute-bearing water at high pressure and in liquid state to the earth's surface, where it is used by transfer of its heat to a closed-loop boiler-turbine-alternator combination for the generation of electrical or other power. Cooled, clean water is regenerated by the surface-located system for re-injection into the deep well and residual concentrated solute-bearing water is pumped back into the earth.

8 Claims, 3 Drawing Figures

PATENTED AUG 5 1975

SHEET 1

3,898,020

GEOTHERMAL ENERGY SYSTEM AND METHOD

CROSS REFERENCE TO RELATED APPLICATION

This is a division of patent application Ser. No. 300,058, filed Oct. 24, 1972, now U.S. Pat. No. 3,824,793 and entitled "Geothermal Energy System and Method" in the name of Hugh B. Matthews.

BACKGROUND OF THE INVENTION

1. Field of the Invention

The invention relates generally to efficient means for the generation of electrical or other power utilizing energy from geothermal sources and, more particularly relates to arrangements including efficient super-heated steam generation and pumping equipment for application in deep hot water wells for transfer of thermal energy to the earth's surface.

2. Description of the Prior Art

While geothermal energy sources have been employed for the generation of power to a limited extent, available systems operate at relatively low efficiency and have many additional serious disadvantages. In the relatively few installations in which substantially dry steam is supplied by wells at the earth's surface, the steam may be fed, after removal of solid matter, from the well head directly to a turbine. On the other hand, most geothermal wells are characterized by yields of a mixture of steam and hot water at the earth's surface so that the water must be separated from the steam before the latter is used in a turbine.

In both of these kinds of installations, relatively low pressure steam normally results, requiring special turbines and yielding relatively inefficient power generation as compared to generation of power using normally operated fossil fuel-powered or nuclear-powered electrical generation equipment. In only a few instances do geothermal wells actually produce truly superheated steam with only minor amounts of undesired gasses and with no liquid water.

The presence of significant amounts of liquid water in wells used with prior art geothermal systems presents other problems in addition to the separation problem. If the water is only moderately hot, extracting thermal energy from it may be expensive or, at least, inefficient. Whether or not the heat is used, the water must be handled. The water usually bears considerable concentrations of silica and of alkali salts, including chloride, sulfate, carbonate, borate, and the like ions, all of which dissolved salts present precipitation problems at the point at which any part of the water may abruptly turn to steam. If the alkaline water is allowed to escape at the installation, severe stream or river chemical and thermal pollution results. Finally, there is some evidence that the removal of large amounts of water from geothermal reservoirs may lead, in a generally unpredictable manner, to undesirable land subsidence in the vicinity of thermal well installations.

SUMMARY OF THE INVENTION

The present invention provides means for efficient power generation employing energy derived from geothermal sources through the generation of dry super-heated steam and the consequent operation of subsurface equipment for pumping extremely hot well water at high pressures to the earth's surface. Clean water is injected at a first or surface station into the deep well where thermal energy stored in hot solute-bearing deep well water is used at a second or deep well station to generate super-heated steam from the clean water. The resultant dry super-heated steam is used at the well bottom for operating a turbine-driven pump for pumping the hot solute-bearing well water to the first station at the earth's surface, the water being pumped at all times and locations in the system at pressures which prevent flash steam formation. The highly energetic water is used at the surface or first station in a binary fluid system so that its thermal energy is transferred to a closed-loop surface-located boiler-turbine system for driving an electrical power alternator. Cooled, clean water is regenerated by the surface system for re-injection into the well for operation of the steam turbine therein. Undesired solutes are pumped back into the earth via a separate well in the form of a concentrated brine.

In contrast with the relatively poor performance of prior art systems, the present invention is characterized by high efficiency as well as by many other advantageous features, it is not limited to use with the rare dry steam sources, and it is devoid of the water and steam separation problems attached to the more usual prior art systems used with mixed steam and hot water supply wells. Since the novel power system operates with dry, highly super-heated steam, existing efficient heat transfer elements and efficient high pressure turbines may readily be employed. According to the invention, the very large calorific content of high temperature water subjected to high pressure is efficiently employed. Since high pressure liquid is used as the thermal transfer medium, undesired flash steam formation is prevented, along with its undesired attendant deposition of dissolved materials. Since the dissolved salts are efficiently pumped back deep into the earth as remotely as need be from the geothermal source, surface pollution effects are avoided and there is relatively little risk of land sinkage in the vicinity of the geothermal source.

DESCRIPTION OF THE PREFERRED EMBODIMENT

The invention provides an efficient mechanism for extracting geothermal energy for the generation of electrical or other power from heat which naturally radiates outwardly toward the surface of the earth from its interior and especially from hot strata providing localized geothermal energy sources found in many localities in the very outer layers of the earth's surface. In these thermal reservoirs, thermal energy is stored both in solid earth materials of the strata and in water and in steam, since water readily migrates into hot fractured rock beds and cavities therein, the water and steam being capable of transferring heat energy from such thermal reservoirs to a water or steam well and thence to the earth's surface. Water or steam may also serve as media for transferring heat from a deeply located geothermal source, the water flowing upwardly to depths which may readily be reached by drilled wells.

Figure 1:
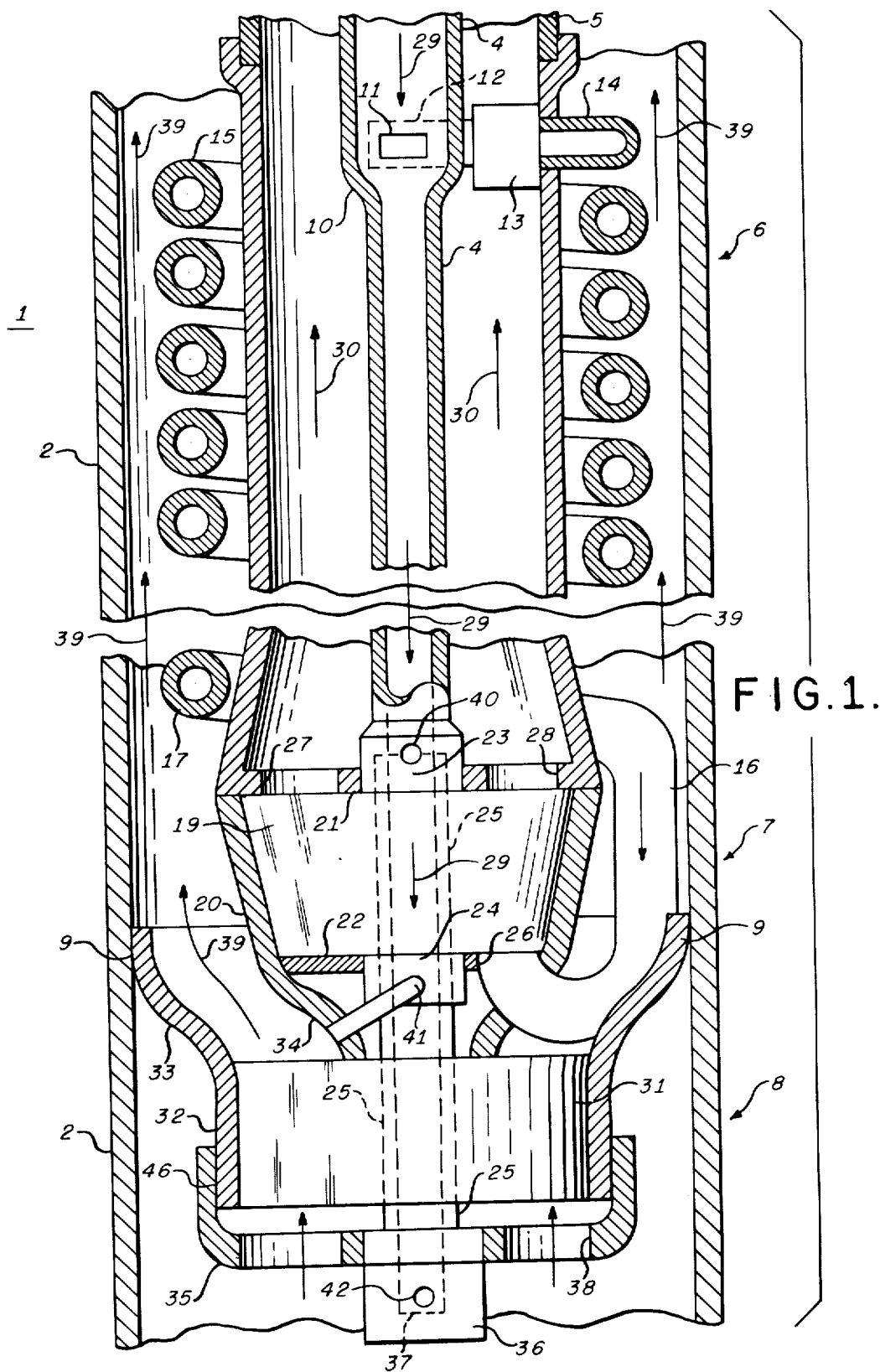
FIG. 1 is an elevation view, mostly in cross section, of the novel deep well geothermal pumping apparatus of the system.
Figure 2:
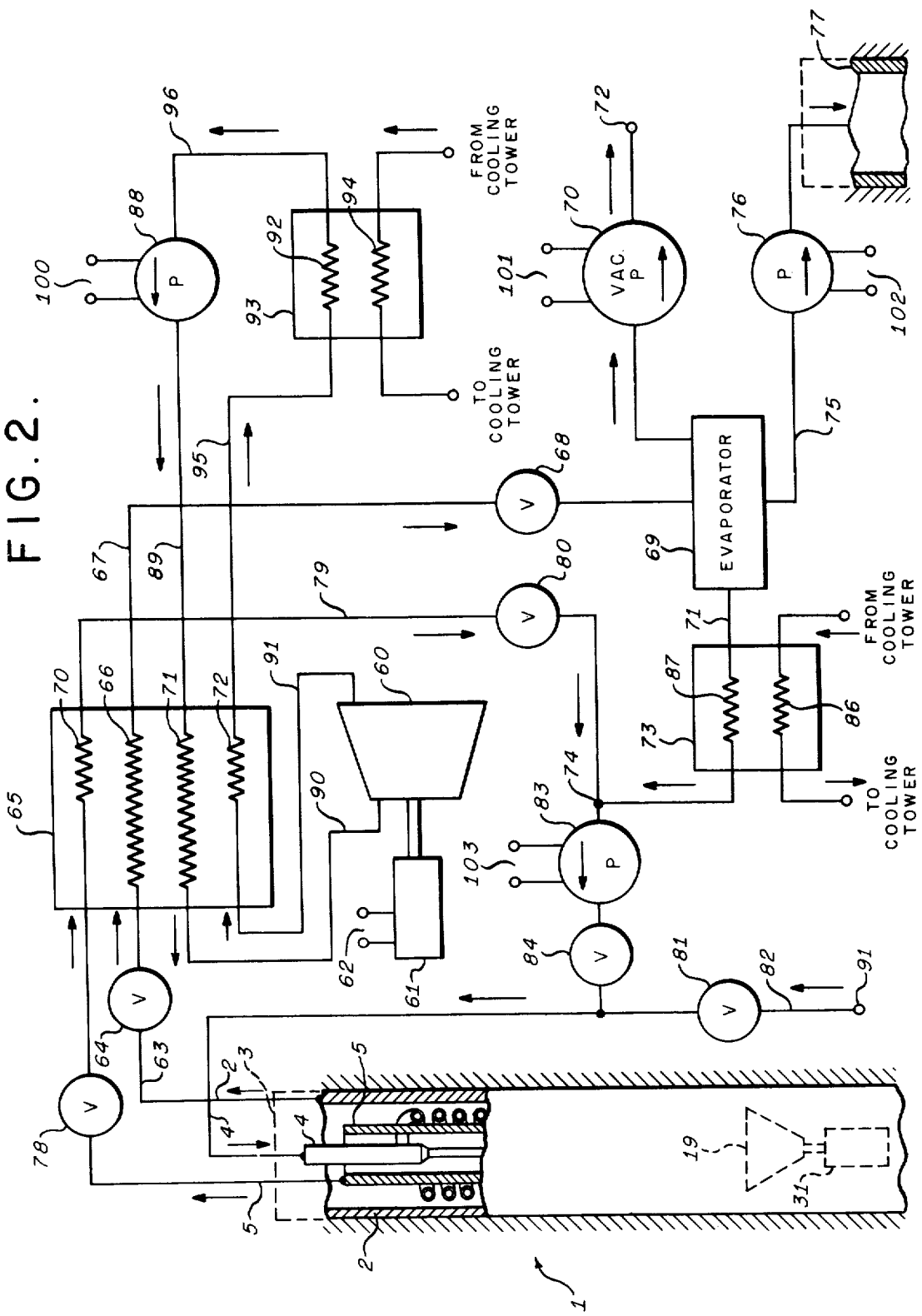
FIG. 2 is a diagrammatic representation of the apparatus of the earth's surface cooperating with the pumping apparatus of FIG. 1.

FIGS. 1 and 2 illustrate the structure of the portion 1 of the novel geothermal energy system which is immersed in a deep well in strata far below the surface of the earth or other planet and which is located particularly at a depth such that a copious supply of extremely hot water under high pressure is naturally available, the structure being supported at the second station within a generally conventional well casing pipe or conduit 2. Extending downward from the well head 3 (seen in FIG. 2 and located at or near the earth's surface), the casing pipe 2 surrounds in preferably concentric relation an innermost stainless steel or other quality alloy steep pipe or conduit 4 for supplying relatively cool and relatively pure water near the bottom of the well for purposes which will be explained. A second larger internal diameter pipe or conduit 5 of similar quality and surrounding pipe 4 is also provided within casing 2, extending from well head 3 to the energy system apparatus at the bottom of the well for permitting the hot turbine exhaust steam to flow to the surface of the earth, as will be described.

The novel geothermal energy extraction apparatus 1 located at the bottom of the well comprises, as will be explained, several cooperating elements, including a steam generation section 6, a steam turbine or other rotary motive section 7, and a rotary hot water pumping section 8 driven from motive section 7. The several elements of the three sections are suspended in cooperative relation adjacent the bottom of the well within casing 2 and relative to the inner pipes 4 and 5, partial support being supplied at seal 9 from the inner wall of casing pipe 2 and further support by concentric pipes 4 and 5. Additional support or alignment means may be supplied, as will be evident to those skilled in the art, by additional support elements which may be of conventional nature.

It will be seen in FIG. 1 that relatively clean and cold water is pumped down inner pipe 4 from the first or surface station to the region of constriction 10. On the upper side of constriction 10, one or more openings are formed in pipe 4, such as opening 11, coupling cool water through branching pipe 12 to a conventional pressure regulator and reducer 13. Openings 11, pressure regulator and reducer 13, and the actual pressure of the clean water present in pipe 4 are arranged to permit clean water to flow through pipe 14 into the steam generation section 6 without undesired back-flow of steam. The clean water flows from the conventional pressure reducer and regulator 13 located between pipes 4 and 5, through pipe 14 and into a long alloy steel heat exchanger or boiler tube 15 formed as a plurality of turns which may be located in a cylindrical stack between pipe 5 and casing pipe 2.

Extremely hot water flows upward in the region between pipes 2 and 5, as will be seen, for converting the clean water injected into coiled tube 15 into highly energetic dry super-heated steam. The clean water, before flowing through pressure regulator and reducer 13, is at a very high pressure due to its hydrostatic head. Pressure reducer 13 drops this pressure sufficiently so that the clean water can be vaporized and super-heated by the well water. The resultant steam is directed through a downwardly oriented pipe 16 extending from the last turn 17 of coiled pipe 15 of steam generator section 6, pipe 16 lying adjacent the inner wall of casing pipe 2. In the vicinity of the last turn 17 of steam generator section 6 and of the downwardly extending pipe 16, the pipe 5 is expanded in diameter so as to form an expanded section 18 generally commensurate in cross section with the shape of steam turbine 19.

Steam turbine 19 is supported within the confines of an oppositely tapered alloy steel cylindrical wall 20, which wall serves as an extension of the expanded wall section 18, and the opposed spaced parallel circular steel walls 21 and 22. Turbine 19 is supplied with water-lubricated bearing housings 23 and 24 located at the centers of the respective circular walls 23, 24. Bearing housings 21, 22 respectively contain bearings for direct support of the main shaft 25 of turbine 19, as will be further explained. Walls 20, 21 and 22 are solidly bonded together as by welding or other fastening means for serving as a supporting enclosure of turbine 19; however, the high pressure steam pipe 16 is permitted entry into the input section of turbine 19 through aperture 26 in bottom wall 22. Likewise, an array of large openings, such as apertures 27 and 28, are provided in the upper circular wall 21 so as to permit exhaust of used steam from turbine 19 into the space between concentric pipes 4 and 5. Thus, relatively clean water flowing downwardly in the sense of arrow 29 within pipe 4 may flow after conversion as partially spent dry steam upward to the well top in the sense of arrows 30 in the region bounded by pipes 4 and 5.

Steam turbine 19 may be selected from several types of available devices; for example, turbine 19 may be of the type commonly defined as the impulse turbine, wherein steam expansion occurs only in the stationary blades or nozzles of the turbine. In such devices, the turbine may consist of a nozzle followed by a plurality of rows of blades rotating about an axis, the blades being separated by redirecting blades. Suitable turbines, are described, for example, on page 1,225 et seq. of L. S. Marks: *Mechanical Engineers' Handbook*, Fourth Edition (1941), McGraw-Hill Book Company, Inc., and elsewhere.

The steam generation section 6 and the turbine 19 may be one of the conventional arrangements of the type using steam generating coils in series or in parallel relation or may include one or more separate stacked coils in section 6 for reheat of steam between stages of turbine 19. In some applications, at least a two stage turbine will be used according to the permitted outer diameter of the turbine.

The function of steam turbine 19 is to drive the hot water pump 31 located within pumping section 8. Several types of rotary multiple stage, mixed-flow, or turbo-pumps equipped with vane diffusers are available for use as pump 31, including certain types of pumps often used as deep well pumps. Pumps of suitable kind are described liberally in the literature. For example, reference may be had to page 5–59 et seq. of J. K. Salisbury: *Kent's Mechanical Engineers' Handbook - Power*, 12th Edition (1954), John Wiley and Sons.

Pump 31 is supported within a cylindrical housing 32 concentrically located within casing pipe 2. The upper portion of housing 32 is smoothly expanded in diameter to form a tapered well section 33 having a shaped upper part suitable for sealing at 9 to the inner wall of casing pipe 2. The tapered wall 20 surrounding turbine 19 is extended to form bell shaped section 34, tapered wall 33 and bell-shaped wall 34 being generally similar in curvature so as to form an annular hydrodynamic fluid flow region between them, as will be explained.

Pump 31 is retained in part within housing 32 by a steel end wall 35, welded or otherwise fastened to housing 32 at annular surface 36. Wall 35, at its center, accommodates an end thrust bearing housing 46 for supporting the end 37 of shaft 25; it will be seen that bearing housings 24 and 36 contain bearings which may be clean water lubricated and which may cooperate in supporting shaft 25 and the impeller of hot water pump 31. End wall 35 has an annular array of apertures, such as opening 38, which admit hot water to pump 31; the latter fluid is accelerated by the impeller of pump 31 and exits therefrom into the annular region defined by the respective concentric tapered and bell shaped walls 33, 34. Since these sections are respectively and smoothly joined to casing pipe 2 and to pipe 5, the hot water is pumped upward to the top of the well in the sense of arrows 39.

It is observed that the size of openings 11, the characteristics of pressure regulator 13, and the pressure applied to the cool water at the top of the well are adjusted appropriately for the supply of bearing-lubricating water through constriction 10 downwardly through pipe 4 to bearing housings 23, 24 and 36. In the several bearings, the lubricating water is forced between bearing surfaces, maintaining their separation in the conventional manner while serving as a lubricant. Having served these purposes, the used water is permitted to exit from the respective bearing housings, as via the respective orifices 40, 41, and 42 of the housings 23, 24 and 36. The bearing lubricating water leaving orifice 40 in bearing housing 23 has sufficient pressure, for example, to flow into the exhausting steam from turbine 19; being of small volume, it has insignificant effect. From orifice 41 in bearing housing 24, the lubricating water simply flows into the rising hot water stream indicated by arrow 39. The lower bearing housing 36 and the bearing it contains are lubricated by water that afterwards exits orifice 42 into the hot water being pumped by pump 31. In each case, it is seen that the pressure of the clean lubricating water is such as to prevent undesired reverse flow. For example, at orifice 42, the clean water pressure is sufficient to prevent contaminated well water from entering housing 36 and destroying the bearing therewithin. Since the operation of turbine 19 and pump 31 may in practice either tend to lift or to lower the shaft 25 common to them, the bearings within housings 23 and 36 necessarily have both alignment and thrust absorbing functions. As is well known by those skilled in the art, such bearings may be designed to operate to maintain the fluid gap in a substantially balanced hydrostatic thrust condition.

As shown in FIG. 2, the objective of the deep well apparatus of FIG. 1 is to generate large quantities of electric power at the first or surface station using vapor turbines and electrical generators preferably located at ground level, such as vapor turbine 60 and the electrical alternator 61 of FIG. 2, at power output terminals 62. For this purpose, the hot water pumped to the earth's surface is fed by pipe 5 and its extension (pipe 63) through the normally open valve 64 to element 66 of the conventional boiler-heat exchanger device 65. Device 65 is of conventional closed tank-like nature and is designed to exchange heat between the several heat exchanger elements 66, 70, 71, 72 contained therein. The elements 66, 70, 71 and 72 may take the form of lineal or coiled pipes exchanging heat energy by direct conduction through their metal walls or through a suitable interposed fluid in the well known manner. Heat from the hot water of pipe 63 is a major source of heat for supply to device 65. The hot water, having been relatively dropped in temperature within boiler-heat exchanger 65, is then fed via pipe 67 through the normally open valve 68 to the conventional evaporator 69. Valve 68 may be a throttle valve adjusted for the purpose of dropping the pressure of the fluid flowing through it so that the fluid will readily flash at low temperatures when supplied to evaporator 69.

Evaporator 69 is of conventional nature and is supplied in the usual manner with a conventional vacuum pump 70 which considerably reduces pressure within evaporator 69, causing the water therein to boil, and releasing steam via exhaust 71. Vacuum pump 70 serves to remove the most volatile gasses at terminal 72, some of which gasses are undesirable, being corrosive, from circulation past evaporator 69 into condenser 73. Valuable gasses, such as helium and other noble gasses, may be extracted at terminal 72 and utilized, if desired.

Evaporator 69 performs two functions; as suggested in the foregoing paragraph, it generates clean steam which is condensed by the conventional condenser 73 and is supplied as water at junction 74 for augmenting the clean water supply. A further major portion of the water originally flowing upward in pipe 5 is returned by pipe 75 through pump 76 to the earth well formed by pipe 77. Thus, a major portion of dissolved mineral salts pumped to the surface in solution in the hot water in pipe 5 is returned by pump 77 into the ground. The well formed by pipe 77 may be reasonably remote from the well of the thermal system 1 and may serve more than one such system. It may pass the liquid from pump 76 into an earth stratum different from that associated with the portion 1 of the system, if desired.

A second source of energy supplied to boiler-heat exchanger device 65 is the steam exhausted from the deep well turbine 19 (FIG. 1) via pipe 5. This steam is permitted to flow through normally open valve 78 to the heat exchanger element 70 of boiler-heat exchanger device 65. Element 70 is arranged so that the steam therein is exposed to thermal interchange at the coolest end of device 65 (adjacent the cool clean water input to heat exchanger element 71). Accordingly, the exhaust steam from pipe 5 is largely condensed within heat exchanger element 70. The water thus condensed is supplied through pipe 79 and the normally open valve 80 to the aforementioned junction 74. The water from pipe 79 and that from condenser 73 arrives at junction 74 in relatively pure state and may therefore by supplied to the cold water input pipe 4 of the apparatus of FIG. 1. With valve 81 in branch line 82 closed, the water at junction 74 is fed by a conventional feed pump 83 through the normally open valve 84 and pipe 85 into pipe 4. It will be appreciated that a variable capacity storage tank may be inserted at the general location of junction 74, so that any fluctuations in supply of clean water for injection by pipe 4 may be smoothed. Also, such water may be supplied by opening the valve 81 from any available source coupled at terminal 91. It will further be understood that condenser 73 may be water cooled, as by supply of cool water from a cooling tower (not shown) to heat exchanger element 86 in heat exchanger 73. Alternatively, element 87 may be cooled in many locations simply by forced air.

The major elements for supply of heat into boiler-heat exchanger device 65 have now been described. The heat stored therein is removed and used in a substantially conventional manner to operate the surface-located vapor turbine 60. For this purpose, liquid is supplied by a conventional feed pump 88 via pipe 89 to the heat exchanger element 71 of boiler-heat exchanger 65. Flow of the liquid is counter to the direction of flow of heat into device 65 in elements 66, 70, and 72. The liquid evaporates and consequently generates extremely high temperature vapor that is coupled via pipe 90 to the input stage of turbine 60. After performing useful work therein, the turbine exhaust vapor is fed by pipe 91 into boiler-heat exchanger 65, where part of its remaining thermal energy is abstracted near the input of element 71. The vapor then flows to a conventional condenser device 93 having heat exchanger elements 92 and 94 and then flows again as a liquid via pipe 96 to the feed pump 88. Condenser 93 may be cooled by flow of water from a cooling tower (not shown) through heat exchanger element 94. The exchanger 93 may alternatively be air cooled in the conventional manner. A fluid such as water may be used for the generation of high temperature vapor within boiler-heat exchanger 65 and its associated surface-located loop or certain organic fluids affording best use in Rankine cycle operation may alternatively be employed.

Operation of the invention will be apparent from the foregoing description. It is seen that the geothermal energy deep well system 1 consists of a deeply submerged super-heated steam generation section 6, a turbine section 7 driven by the superheated steam, and a hot water pumping section 8 all located in a source region where there is present large quantities of extremely hot water which may also include relatively large quantities of dissolved materials. Clean water, formed by condensing the clean steam at the surface, is supplied to the steam generation section 6 for driving the turbine 19 and is also supplied to bearings in the turbine and pump sections thereof. The pump section 8 serves to increase the pressure level of the hot water so that it reaches the surface of the earth still well above its saturation pressure.

The pressure head in the vicinity of pump 31 is great enough to prevent cavitation damage to the pump and any consequent performance loss in the pump. In general, it is arranged that actual pressures in the hot water are maintained above the flash point by a wide safety margin at all points within the hot water flow system within the well. This feature is one of particular importance for the success of the invention, since the hot water cannot flash into steam when held at all times and locations above its flash pressure. Flashing of the hot water into steam is to be prevented, since it is likely to be disruptive if not actually destructive of equipment and at least will result in the deposition of large amounts of mineral scale in the general location of the flash event. The system at the surface of the earth may then readily extract heat from the extremely hot water for the generation of electrical power or for other useful purposes. What energy remains in the steam used to drive the deep well turbine section 7 is also returned to earth's surface for recovery in the surface-located system.

The deep well portion 1 may be started or stopped in the following manner. For example, with no power supplied to pump 88 and with valve 84 closed and valve 81 open, conventional sources of high pressure clean water and compressed air at terminal 91 may be used to force air and water down pipe 4 into the steam generation section 6 and into bearing housings 23, 24, 36 to lift the bearings. Turbine 19 begins to turn, first as a result of the compressed air flow, then as a result of steam being generated, gradually increasing its speed, pump 31 gradually lifting more and more hot water through pipe 5. The ratio of air to water is reduced until purely water is supplied, which supply may then be switched to pump 83 by closing valve 81 at the same time valve 84 is opened. This operation continues until the first steady state of the loop containing geothermal apparatus 1 is reached, boiler-heat exchanger 65 having substantially reached operating temperature. Now, pump 88 is started and high energy steam begins to be supplied by pipe 90 to the surface-located turbine 60. Eventually, this second loop reaches its first steady state condition, after which the useful load may be placed across alternator 61. The entire system shortly reaches a final equilibrium status with respect to the load on alternator 61, supplying useful electrical power in large amounts, regenerating clean water for its own use within the deep well apparatus 1, and returning undesired solute-containing material to the earth's interior via the well of pipe 77. The system may be shut down by closing valves 64 and 78 and by gradually cutting off the supply of cold water flowing through pipe 85.

It will be understood that techniques well known in the art may be used to extract even more energy from the system at the first station when in operation. For example, the energy of the hot water flowing in pipe 67 out of heat exchanger element 66 may be used in part by supplying it to a conventional liquid turbine (not shown) that may be used mechanically to drive various pumps, such as pumps 70 and 76, and other pumps that may be required in the usual manner in pipes coupled between heat exchangers 73 and 93 and any associated cooling towers. On the other hand, electrical power from alternator 62 or from a standby start-up generator may be supplied to the respective terminals 100, 101, 102, and 103 of pumps 88, 70, 76, and 83 to electrical motors integrated within each of the several pumps.

The bearings contained within bearing housings 23, 24, and 36 may generally be of well known types, including types used in conventional turbines and do not require detailed discussion. Since the direction of thrust on the bearings when the machine of FIG. 1 is operating is well known to those skilled in the art to be controllable in a conventional manner by the designer, the major thrust may be placed in an upward direction along shaft 25, an aid to the support of the mass of the shaft and of the turbine and pump rotors. Fluid film bearings of the type using a large flow of liquid are suitable. They may use faces defining the fluid bearing gap composed of rubber, as in conventional deep well pumps, or of refractory materials such as certain ceramics. Dialumina trioxide ($Al_2O_3$) has been found useful as a material in such bearing faces when coated on an alloy steel backing surface. Other suitable bearing faces are readily available.

Figure 3:
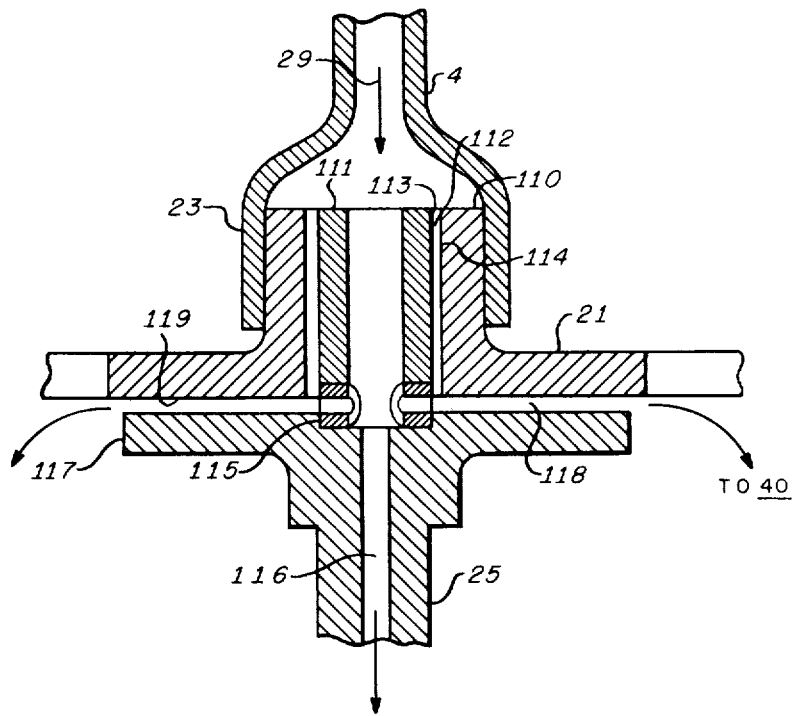
FIG. 3 is an elevation view in cross section of a part of the apparatus of FIG. 1.

A generally conventional fluid bearing useful in the invention is illustrated in one form in FIG. 3 as it might be applied within the turbine bearing housing 23, for example. As is also seen in FIG. 1, downward flowing lubricating water is supplied in pipe 4 to the bearing housing 23 which is affixed to a stub pipe 110 integral with and extending upwardly from the upper wall 21 that encloses turbine 19 (not shown in FIG. 3). The stub pipe 110 has a relatively large vertical bore for accommodating the rotor 111 of the aligning portion of the bearing, a gap 112 being provided between the outer cylindrical surface 113 of bearing rotor 111 and the inner cylindrical surface 114 of stub pipe 110. The aligning bearing rotor 111 is affixed within a short bore at 115 at the upper end (for example) of shaft 25, shaft 25 being supplied with an internal bore 116 coupling lubricating water from pipe 4 toward any lower-mounted bearings.

The end of shaft 25 is provided with a circular thrust bearing rotor 117 which, if desired, may be intergral with shaft 25. In normal operation, a gap 118 is formed between opposed surfaces of thrust bearing rotor 117 and a bearing face 119, such as a bearing face formed on a surface of wall 21. Flow of fluid outward to aperture 40 is controlled in part by the operating widths of gaps 112, 118 and the relative diameters of pipe 4, of the bore in rotor 111, and of the bore 116 in shaft 25. Proper metering may be aided by the meter orifices in inserts 115 through which water is injected into gap 118.

While the invention has been described in its preferred embodiment, it is to be understood that the words which have been used are words of description rather than of limitation and that changes within the purview of the appended claims may be made without departure from the true scope and spirit of the invention in its broader aspects.

I claim:

1. Apparatus for transferring thermal energy from an interior hot stratum of an earth for utilization adjacent the surface of said earth comprising:

first, second and third conduit means, rotary pump means operatively coupled for pumping hot liquid within said first conduit means, rotary motive means for driving said pump means operatively coupled within said second conduit means, and heat exchanger means within said first conduit means having liquid input means operatively coupled to said third conduit means and output means for suppling hot driving vapor to said rotary motive means.

2. Apparatus as described in claim 1 wherein said rotary pump means comprises rotary multiple stage liquid pump means.

3. Apparatus as described in claim 2 wherein said rotary motive means comprises rotary impulse vapor turbine means.

4. Apparatus as described in claim 3 wherein said rotary pump and rotary motive means have common driving shaft means equipped with liquid lubricated bearing means.

5. Apparatus as described in claim 4 wherein said common shaft means includes an axial bore.

6. Apparatus as described in claim 5 wherein said axial bore within said common shaft means is coupled to said third conduit means for supply of liquid lubricant to said bearing means.

7. Apparatus as described in claim 1 wherein said first, second, and third conduit means comprise substantially concentric pipe means.

8. Apparatus as described in claim 6 wherein said third conduit means and said common shaft means are adapted for use with pump means for providing fluid flow only from said third conduit means through said common shaft means and then through said liquid lubricated bearing means.

* * * * *